Jan. 6, 1948. A. E. KNESS 2,433,913
ANIMAL TRAP
Filed Nov. 1, 1945 2 Sheets-Sheet 1

Inventor
Austin E. Kness
By Clarence A. O'Brien
and Harvey B. Jacobson
Attorneys Jan. 6, 1948.  A. E. KNESS  2,433,913
ANIMAL TRAP
Filed Nov. 1, 1945  2 Sheets-Sheet 2

Austin E. Kness  Inventor

By Clarence A. O'Brien
and Harvey B. Jacobson
Attorneys

Patented Jan. 6, 1948

2,433,913

UNITED STATES PATENT OFFICE 2,433,913

ANIMAL TRAP

Austin E. Kness, Albia, Iowa

Application November 1, 1945, Serial No. 626,055

5 Claims. (Cl. 43—74)

The present invention relates to new and useful improvements in animal traps of a type as disclosed in my prior Letters Patent No. 1,758,952 dated May 20, 1930.

An important object of the present invention is to improve the latch construction for the rotating unit whereby the trip device for the latch member is more quickly returned to latch-locking position whereby to limit the rotation of the rotary unit after the paddle of the rotary unit has moved sufficiently to eject the animal into the trap compartment and thus prevent unnecessary unwinding of the spring employed for operating the rotating unit.

A further object of the invention is to provide a device of this character of simple and practical construction, which is efficient and reliable in operation, relatively inexpensive to manufacture and otherwise well adapted for the purposes for which the same is intended.

Other objects and advantages reside in the details of construction and operation as more fully hereinafter described and claimed, reference being had to the accompanying drawings forming part hereof, wherein like reference numerals refer to like parts throughout, and in which:

Figure 1:
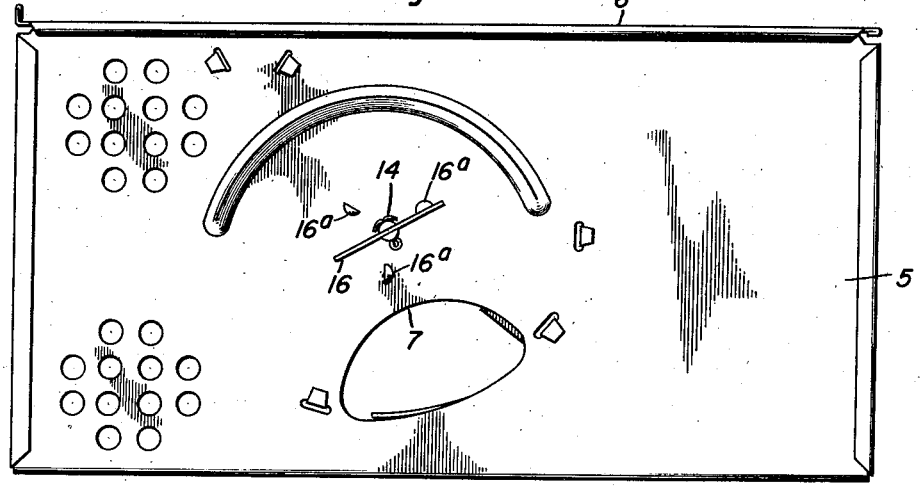
Figure 1 is a side elevational view.
Figure 2:
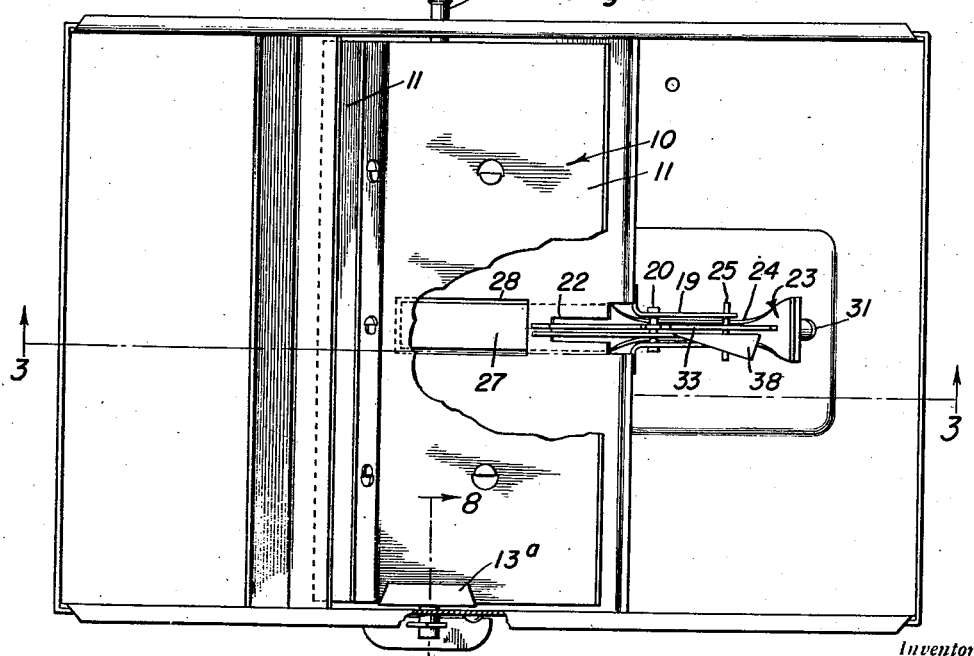
Figure 2 is a top plan view with the cover removed.
Figure 8:
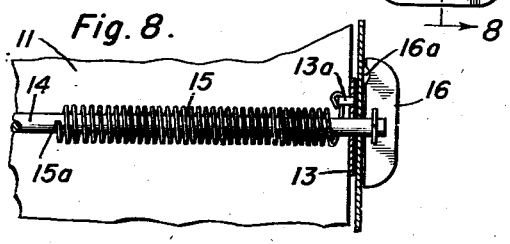
Figure 3:
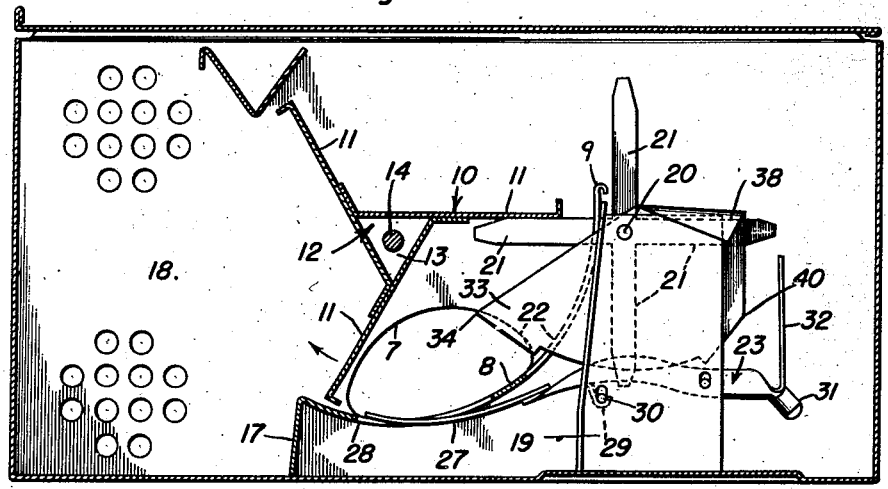
Figures 4, 5:
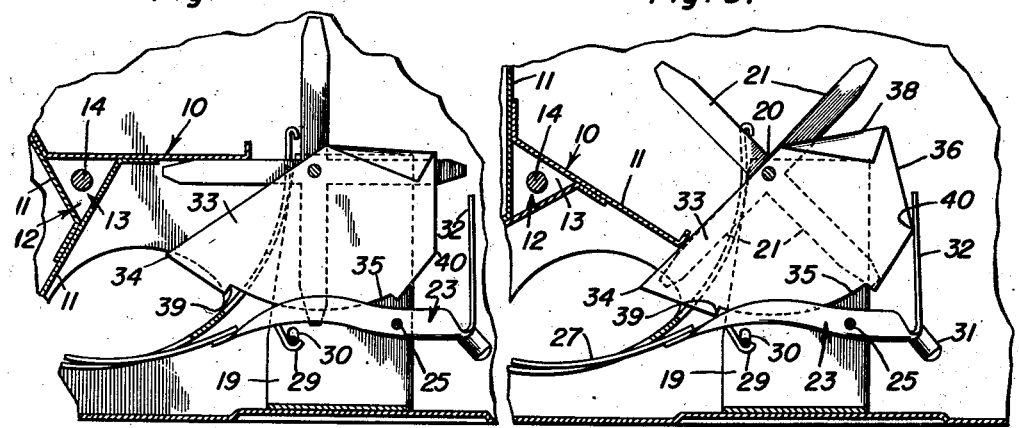
Figure 6:
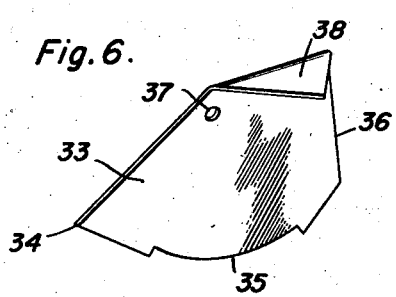
Figure 7:
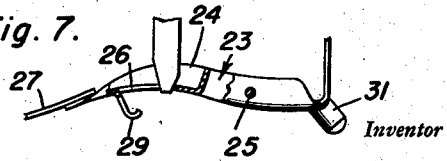

Figure 3 is a longitudinal sectional view taken substantially on a line 3—3 of Figure 2, Figure 4 is a fragmentary longitudinal sectional view of the latch and trip mechanism showing the latch in locked position, Figure 5 is a similar view showing the latch in released position, Figure 6 is a perspective view of the trip return plate, Figure 7 is a fragmentary longitudinal sectional view of the trip member, and Figure 8 is a fragmentary sectional view of the rotating unit taken substantially on a line 8—8 of Figure 2.

Referring now to the drawings in detail, wherein, for the purpose of illustration, I have disclosed a preferred embodiment of this invention, the trap includes a housing 5 preferably of rectangular shape and having a removable top 6 which is preferably longitudinally slidably associated with the side walls of the housing. The opposite side walls of the housing are formed substantially centrally thereof and adjacent the bottom with animal entrance openings 7, the lower edges of which at least describe segments of circles.

Arranged transversely within the housing 5 is a partition or platform 8 that extends from the lower ends of the lower edges of the openings 7 directly in alignment with said edges and toward the end of the housing remote from said lower ends of the lower edges of the openings, as more clearly illustrated in Figure 3 of the drawings. The partition or platform 8 also describes an arc of a circle and is of much greater length than the length of the lower edges of the entrance openings and with the upper edge of the platform 8 terminating substantially centrally of the housing and from which point the material forming said wall or partition is bent toward the adjacent end of the housing to form a flange 9.

Arranged transversely within the housing is a rotating unit designated generally by the reference character 10. The rotating unit includes a plurality of radially extending blades or paddles 11 having their inner edges arranged to form a chamber 12 enclosed by end plates 13.

The mounting means for the rotating unit comprises a shaft 14 positioned in the chamber 12 and extending through the end plates 13 for rotatably and slidably mounting in the sides of the housing 5 for a purpose presently seen.

Surrounding the shaft 14 is a normally expanded coil spring 15 having one end connected to an anchor member 13a on one end plate 13 on said unit 10, the other end of said spring 15 being connected, as at 15a, to said shaft 14 so that by rotating said shaft 14, in the direction indicated by the arrow in Figure 3, said spring 15 may be wound up to tension the rotating unit 10 for rotation in the same direction. A finger grip cross bar 16 on one end of said shaft 14 provides for rotating said shaft to wind up said spring 15, and said spring 15 tends to slide said shaft 14 endwise in a direction to engage said bar 16 with one side wall of the housing 5. Punched out ratchet nubs 16a on said side wall, and over which said cross bar 16 ratchets in winding up the spring 15, provide for latching said shaft 14 in rotating the same intermittently to wind up said spring 15, in a manner which will be clear.

The outer edges of the paddles or blades 11 of the rotating unit are adapted to travel closely along the arcuate surface of the platform 8.

The lower front edge of the platform 8 is provided with a downturned portion 17 and cooperates with the rotating unit 10 to form a trap chamber 18 at the front end of the housing.

A U-shaped bracket 19 is supported in the bottom of the housing behind the platform 8 and in the upper portion of which is journaled a shaft 20 having a plurality of arms 21 extending radially therefrom to constitute the latch member, the arms preferably being arranged in the form of a cross at right angles, or ninety degrees with respect to each other. The arms 21 are adapted to work in a slot 22 in the upper portion of the platform 8 to project under blades or paddles 11 of the rotating unit.

A trip member, designated generally at 23, includes a channel-shaped portion 24 pivoted on a pin 25 extending transversely of the legs of the bracket 19, the trip being positioned under the legs 21 of the latch member.

The bottom of the trough 24 is formed with a longitudinally extending opening 26, against the rear edge of which the lowermost leg 21 of the latch member is adapted to engage to secure the latch member against rotating movement.

A plate 27 projects forwardly from the front end of the trip member 23 and is freely positioned in an opening 28 formed in the bottom portion of the platform 8.

A hook 29 is struck from the bottom portion of the trip member 23 and adapted for engagement with a stop pin 30 carried by the bracket 19 to limit upward pivotal movement of the trip member and plate 27.

At the rear end of the trip member is formed or attached a weight 31 to counterbalance the forward end of the trip and to swing the front end of the trip into its raised position.

A trip return plate 32 rises from the rear end of the trip behind the bracket 19.

A trip return plate 33 is formed with a pointed front edge 34, a curved lower edge 35 and a straight rear edge 36 and is also formed adjacent its upper edge with an opening 37 for freely mounting the trip return plate on the shaft 20. The plate 33 is positioned between the legs of the bracket 19 and its upper edge is formed with a downturned flange 38 overlying one of the legs of the bracket 19 to limit upward swinging movement of the pointed front end 34 and the downward swinging movement of the rear straight edge 36. The front portion of the curved lower edge 35 terminates in a shoulder 39 adapted to engage the rear edge of the slot 26 of the trip 23 to limit downward swinging movement of the pointed front end 34 and the upward swinging movement of the rear straight edge 36.

The lower portion of the rear straight edge 36 is formed with a cam hump 40 adapted to engage the upstanding plate 32 at the rear end of the trip 23 to return the front plate 27 of the trip to its raised position.

In the operation of the device, when the animal enters one of the openings 7 in the side of the housing 5 and travels along the platform 8 behind the lowermost paddle 11, until the plate 27 is reached, the weight of the animal will move the plate 27 downwardly in the opening 28 of the platform 8 and actuate the trip 23 to release the arm 21 of the latch member. The spring 15 will then rotate the rotating unit in the direction as shown by the arrow in Figure 3, whereupon one of the blades of the rotating member will move downwardly along the platform 8 and swing the trip return plate 33 rearwardly to cause the cam hump 40 to engage the upstanding plate 32 of the trip and thus cause an instant return of the trip to its raised position so that the neck arm 21 of the latch member will engage in the slot 26 and lock the latch member and the rotating unit against further movement.

The shoulder 39 of the trip return plate 33 also enters the slot 26 to engage the rear edge thereof to limit rearward swinging movement of the trip return plate.

The weight 31 maintains the trip with its front end in raised position for subsequent release by an animal entering the trap.

In view of the foregoing description taken in conjunction with the accompanying drawings, it is believed that a clear understanding of the construction, operation and advantages of the device will be quite apparent to those skilled in this art. A more detailed description is accordingly deemed unnecessary.

It is to be understood, however, that even though I have herein shown and described a preferred embodiment of my invention that the same is susceptible to certain changes fully comprehended by the spirit of the invention as herein described and the scope of the appended claims.

What I claim is:

1. An animal trap including a housing having an entrance opening and a spring-actuated rotatable unit mounted in the housing and having paddles adapted to push an animal entering the opening toward one end of the housing, a latch mechanism including a rotatable member having radially extending arms engaging the paddles to hold the unit inactive, an animal-actuated trip device for the latch mechanism, and a trip return device actuated by the unit to return the trip to its latch-engaging position.

2. An animal trap including a housing having an entrance opening and a spring-actuated rotatable unit mounted in the housing and having paddles adapted to push an animal entering the opening toward one end of the housing, a latch mechanism including a rotatable member having radially extending arms engaging the paddles to hold the unit inactive and movable by the unit, an animal-actuated trip device for the arms of the latch mechanism, and a trip return device actuated by the unit to return the trip to its latch-engaging position.

3. An animal trap including a housing having an entrance opening and a spring-actuated rotatable unit mounted in the housing and having paddles adapted to push an animal entering the opening toward one end of the housing, a latch mechanism including a rotatable member having radially extending arms engaging the paddles to hold the unit inactive arranged in interengaged relation with the paddles, an animal-actuated trip device for the latch mechanism, and means movable with the latch mechanism and engaging the trip to return the latter to its latch-engaging position.

4. An animal trap including a housing having an entrance opening and a spring-actuated rotatable unit mounted in the housing and having paddles adapted to push an animal entering the opening toward one end of the housing, a latch mechanism including a rotatable member having radially extending arms engaging the paddles to hold the unit inactive arranged in interengaged relation with the paddles, an animal-actuated trip device for the latch mechanism and including an upstanding member, and a pivoted trip return plate having one edge in the path of the paddles for actuation thereby and having its opposite edge arranged for engaging the upstanding member to return the trip to its latch-engaging position.

5. An animal trap including a housing having an entrance opening and a spring-actuated rotatable unit mounted in the housing and having paddles adapted to push an animal entering the opening toward one end of the housing, a latch mechanism including a rotatable member having radially extending arms engaging the paddles to hold the unit inactive arranged in interengaged relation with the paddles, an animal-actuated trip device for the latch mechanism and including an upstanding member at its rear end, and a pivoted trip return plate having its front edge in the path of the paddles for actuation thereby and having a cam at its rear edge arranged for engaging the upstanding member to return the trip to its latch-engaging position.

AUSTIN E. KNESS.

REFERENCES CITED

The following references are of record in the file of this patent:

UNITED STATES PATENTS

| Number | Name | Date |
|---|---|---|
| 147,280 | Maloy | Feb. 10, 1874 |
| 1,758,952 | Kness | May 20, 1930 |